(No Model.)
A. WAHLIN.
CENTRIFUGAL BUTTER EXTRACTOR.
No. 498,828. Patented June 6, 1893.
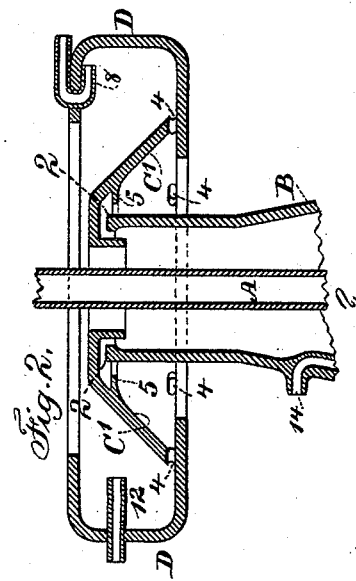
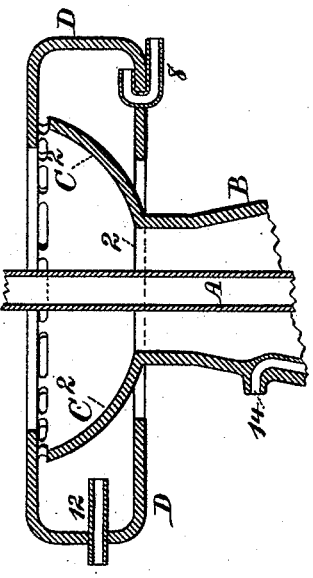
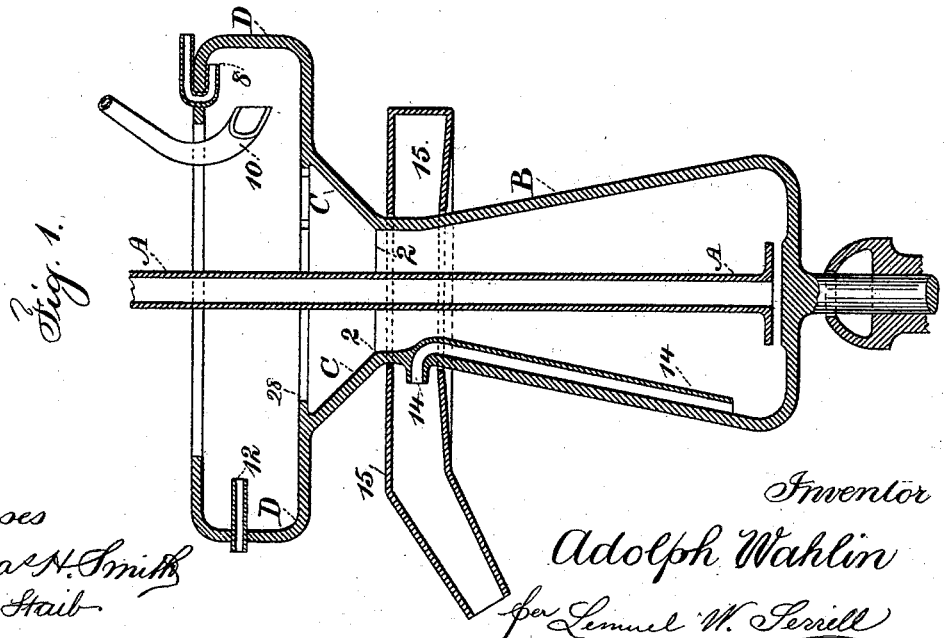
Witnesses
Chas. H. Smith
J. Staib
Inventor
Adolph Wahlin
per Lemuel W. Serrell
atty

United States Patent Office.

ADOLPH WAHLIN, OF STOCKHOLM, SWEDEN, ASSIGNOR, BY MESNE ASSIGNMENTS, TO THE SWEDISH CREAM AND BUTTER SEPARATOR COMPANY, OF NEW JERSEY.

CENTRIFUGAL BUTTER-EXTRACTOR.

SPECIFICATION forming part of Letters Patent No. 498,828, dated June 6, 1893.

Application filed October 19, 1891. Serial No. 409,095. (No model.)

*To all whom it may concern:*

Be it known that I, ADOLPH WAHLIN, a subject of the King of Sweden and Norway, residing at Stockholm, Sweden, have invented an Improvement in Butter-Extractors, of which the following is a specification.

Reference is hereby made to Letters Patent No. 447,530, granted March 3, 1891, for an improvement in centrifugal apparatus for separating butter, and the present invention is a modification of the device therein represented.

I make use of a centrifugal separating device for separating the cream from the skim milk, and the cream is treated with reference to the separation of the watery portions or blue milk from the buttery portions and for causing the particles of butter to adhere together and form granules or small lumps that are easily separated by a screen or sieve from the watery portions and worked as usual in making butter. I find that where the cream is allowed to pass in a layer over a surface by centrifugal action, the watery portions, being more limpid than the buttery portions, maintain a very thin layer when under such rapid centrifugal action, in consequence of which the butter granules are brought upon the surface of the liquid and separate therefrom by a floating action and adhere together in small lumps, and by arresting the buttery particles they form a layer which is capable of being removed from the apparatus either by the centrifugal force or by a scoop or similar device, and by this operation I am enabled to dispense with ledges or annular projections in the separation of the butter.

In the drawings, Figure 1 is a vertical section of the improved apparatus with an inclined separating surface for the cream. Fig. 2 is a similar view with the inclined surface in the opposite direction. Fig. 3 is a similar view with the separating surface curved in section and concave.

The conical separating vessel B is provided with a pipe A through which the milk is introduced and the skim milk is led off by a pipe 14 or equivalent device to a discharge pan 15, as in my aforesaid patent, or any other suitable centrifugal separating device may be employed for separating the cream from the milk, and the cream is delivered at the edge 2 of the opening.

The butter separating surface C is either conical or slightly curved and the angle of the cone may be varied, by which the apparatus is adapted to the speed of rotation or to the average condition of the cream that is acted upon. The more nearly flat the conical surface is the more rapidly the material will pass over the same, and the nearer the conical surface approaches to the cylinder, the slower the movement of the materials will be upon the same.

In Fig. 1 the separating surface C is the upper side of the cone, and in Fig. 2 the separating surface C' is the under side of the cone and in Fig. 3 the separating surface $C^2$ is curved or concave. In either instance the cream is supplied at the inner edge of the separating surface and by the capillary force the liquid adheres to the surface to a greater or less extent, and by the centrifugal force due to the rapid rotation of the apparatus the materials are thrown outwardly, and under all circumstances the watery portions or blue milk are the most limpid and spread in a much thinner layer upon the separating surfaces than the buttery portions or particles; the consequence is that the watery portions are driven or drained away from the butter granules, and these butter granules float and become more or less dry and stick together; the consequence is that the grains of butter increase in size as they are moved outwardly by the centrifugal force, and they are easily separated by a sieve or other known means previous to being worked, as in ordinary butter making.

In Fig. 1 I have represented the separating surface as terminating in an annular receiver or chamber D somewhat similar to that represented in my aforesaid patent, and into this chamber D the watery particles pass and the buttery particles accumulate and form an annular wall inside the skim milk, and the latter may pass off by a pipe 8 and the buttery materials may be received by a scoop 10 or they may pass off through a pipe 12 and be received into any suitable annular vessel or cover.

The operations performed in the device shown in Fig. 2 are identical with those represented in Fig. 1, with the exception that the edge 2 over which the cream passes being within the inverted conical surface C' it is preferable to provide a trough or projection 5 in order that the materials may accumulate sufficiently to pass in a uniform layer upon the separating surface C' and from this separating surface C' the buttery particles and watery or skim milk portions pass by the openings 4 into the annular chamber D, which chamber is constructed and operates as before described. When the separating surface $C^2$ is curved or concave, as shown in Fig. 3, the annular chamber D may surround and come below the upper edge of the separating surface and it is to be provided with pipes or means for delivering the watery portions and the butter, as before described.

In all instances the operations performed are similar, there being only a very thin layer of the skim milk or watery portions, so that the buttery portions substantially float upon and separate from the watery portions, so as to become sufficiently dry for the buttery particles to adhere together into granules.

If desired there may be a ledge 28 around the interior of the separating surface at the larger end thereof, as seen in Fig. 1, to slightly detain the materials before passing off through one or more notches or openings in the ledge.

It will be observed that in the present invention the cream is separated from the skim milk by the centrifugal action and that the further separation of the cream takes place as a continuation of the cream separation; that is to say, the cream, after being separated from the milk, is exposed to a further centrifugal action, whereby the watery portions are thrown off from the buttery portions in such a manner as to cause the buttery particles to accumulate in granules and then these are received into the annular centrifugal chamber D where they are exposed to a further powerful centrifugal action, and the delivery is continuous and automatic, the skim milk passing off by the pipe 8 and the buttery materials by the pipe 12.

I claim as my invention—

1. The method herein specified of separating the buttery portions from milk, consisting in passing the milk into a revolving cream separator and passing the cream therefrom progressively and directly upon a plain or smooth surface that is annular and revolving with rapidity, so that the watery particles in the cream will form a very thin layer upon such separating surface and the buttery particles will float thereon and become sufficiently separated from the watery particles to adhere together in granules, and passing the watery and buttery particles to a suitable receiver from such revolving separating surface, substantially as set forth.

2. The combination in a separating apparatus of a cream separator and a skim milk discharge, with an annular butter separating surface upon which the cream is received from the cream separator, such surface being of a size and shape adapted to spread the watery portions of the cream in such a thin layer that the buttery globules will become separated therefrom sufficiently to coalesce, and a vessel for receiving the separated materials, substantially as specified.

3. The combination in a separating apparatus of a cream separator and a skim milk discharge with an annular and conical butter separating surface upon which the cream is received from the cream separator, such surface being of a size and shape adapted to spread the watery portions of the cream in such a thin layer that the buttery globules will become separated therefrom sufficiently to coalesce, and an annular chamber surrounding the butter separator and receiving the watery and buttery particles, and means for delivering the same from such annular chamber, substantially as specified.

4. The combination in the centrifugal separating apparatus of a cream separating chamber having a skim milk outlet, a centrifugal butter separator having a smooth surface and receiving the cream from the cream separator progressively, an annular chamber into which the buttery and watery particles pass from the butter separator and a discharge for the watery portions and for the buttery portions progressively, substantially as set forth.

5. The combination in a centrifugal separating apparatus of a cream separating chamber and a discharge for the watery portions, a centrifugal butter separator having a smooth surface and receiving the cream progressively from the cream separator and acting centrifugally for the separation of the buttery and watery portions, an annular chamber into which the buttery and watery portions pass from the butter separator, a pipe for the discharge of the watery portions and a separate pipe or opening for the discharge of the buttery portions, substantially as set forth.

6. The combination in a separating apparatus of a cream separating chamber into which the milk is supplied, a discharge for the skim milk, a conical centrifugal butter separator having a smooth surface and receiving the cream from the cream separator, an annular chamber around the discharge from the butter separator and in which the materials treated in the butter separator are received and exposed to a centrifugal action and a progressive delivery of the materials from the annular chamber, substantially as set forth.

7. The combination in a separating apparatus of a conical centrifugal butter separator having a smooth surface for acting upon the cream, an annular receiving chamber around the discharge edge of the conical butter separator and separate discharge pipes or openings for the watery portions and the buttery portions from the annular chamber for the continual separate delivery of the buttery and watery portions, substantially as set forth.

8. In a centrifugal butter separating apparatus, a centrifugal cream separating vessel into which the milk is received, a surface extending outwardly from the cream delivery and on which the cream is spread in a thin layer by the centrifugal action for causing the butter globules to separate from the watery portions, and an annular chamber into which the materials are received and subjected to a further centrifugal action for causing the buttery portions to coalesce, and means for removing the materials from such annular chamber substantially as specified.

Signed by me this 15th day of September, 1891.

ADOLPH WAHLIN.

Witnesses:
GEO. T. PINCKNEY,
WILLIAM G. MOTT.